(12) United States Patent
Schowengerdt et al.

(10) Patent No.: US 7,428,001 B2
(45) Date of Patent: Sep. 23, 2008

(54) MATERIALS AND METHODS FOR SIMULATING FOCAL SHIFTS IN VIEWERS USING LARGE DEPTH OF FOCUS DISPLAYS

(75) Inventors: Brian T. Schowengerdt, Seattle, WA (US); Eric J. Seibel, Seattle, WA (US)

(73) Assignee: University of Washington, Seattle, WA (US)

( * ) Notice: Subject to any disclaimer, the term of this patent is extended or adjusted under 35 U.S.C. 154(b) by 215 days.

(21) Appl. No.: 10/508,753

(22) PCT Filed: Mar. 7, 2003

(86) PCT No.: PCT/US03/07214

§ 371 (c)(1),
(2), (4) Date: Jul. 1, 2005

(87) PCT Pub. No.: WO03/079272

PCT Pub. Date: Sep. 25, 2003

(65) Prior Publication Data

US 2006/0232665 A1    Oct. 19, 2006

Related U.S. Application Data

(60) Provisional application No. 60/365,130, filed on Mar. 15, 2002.

(51) Int. Cl.
*H04N 13/04* (2006.01)

(52) U.S. Cl. .............................. 348/51; 345/6; 351/210

(58) Field of Classification Search ................ 348/47, 348/38, 218, 46, 169, 54, 39, 159, 157, 57, 348/51, 42, 44, 36, 52; 382/190, 103, 254, 382/255, 256, 260, 268, 262, 263, 264, 265, 382/266, 267, 269; 351/210, 209, 211, 212, 351/245, 246, 155, 57
See application file for complete search history.

(56) References Cited

U.S. PATENT DOCUMENTS 5,161,054 A    11/1992    Williams, Jr. et al. ........ 359/462

(Continued)

FOREIGN PATENT DOCUMENTS

EP    0473343    3/1992

(Continued)

OTHER PUBLICATIONS

Andrew T. Duchowski, Binocular Eye tracking in virtual reality for inspection training, 2000, 89-96.*

(Continued)

*Primary Examiner*—Behrooz Senfi
(74) *Attorney, Agent, or Firm*—Ronald M. Anderson

(57) ABSTRACT

A large depth of focus (DOF) display provides an image in which the apparent focus plane is adjusted to track an accommodation (focus) of a viewer's eye(s) to more effectively convey depth in the image. A device is employed to repeatedly determine accommodation as a viewer's gaze within the image changes. In response, an image that includes an apparent focus plane corresponding to the level of accommodation of the viewer is provided on the large DOF display. Objects that are not at the apparent focus plane are made to appear blurred. The images can be rendered in real-time, or can be pre-rendered and stored in an array. The dimensions of the array can each correspond to a different variable. The images can alternatively be provided by a computer controlled, adjustable focus video camera in real-time.

46 Claims, 10 Drawing Sheets

U.S. PATENT DOCUMENTS

| | | | | |
|---|---|---|---|---|
| 5,467,104 | A * | 11/1995 | Furness, III et al. | 345/8 |
| 5,493,595 | A * | 2/1996 | Schoolman | 378/41 |
| 5,495,576 | A * | 2/1996 | Ritchey | 345/420 |
| 5,819,017 | A | 10/1998 | Akeley et al. | 395/122 |
| 5,954,414 | A * | 9/1999 | Tsao | 353/7 |
| 6,133,944 | A * | 10/2000 | Braun et al. | 348/39 |
| 6,133,945 | A | 10/2000 | Stuettler | 348/51 |
| 6,152,563 | A | 11/2000 | Hutchinson et al. | 351/209 |
| 6,163,337 | A | 12/2000 | Azuma et al. | 348/43 |
| 6,183,088 | B1 | 2/2001 | LoRe et al. | 353/7 |
| 6,359,737 | B1 * | 3/2002 | Stringfellow | 359/631 |
| 6,449,309 | B1 * | 9/2002 | Tabata | 375/240.01 |
| 6,466,185 | B2 | 10/2002 | Sullivan et al. | 345/6 |
| 6,487,020 | B1 | 11/2002 | Favalora | 359/619 |
| 6,517,206 | B2 | 2/2003 | Shevlin | 351/243 |
| 6,554,430 | B2 | 4/2003 | Dorval et al. | 353/7 |
| 6,568,809 | B2 | 5/2003 | Trajkovic et al. | 351/209 |
| 6,733,132 | B2 | 5/2004 | Shevlin | 351/243 |
| 6,806,849 | B2 | 10/2004 | Sullivan | 345/6 |
| 7,199,767 | B2 * | 4/2007 | Spero | 345/7 |
| 2001/0000677 | A1 * | 5/2001 | Takagi et al. | 349/25 |
| 2002/0030679 | A1 | 3/2002 | McDowall et al. | 345/421 |
| 2002/0135673 | A1 | 9/2002 | Favalora et al. | 348/42 |
| 2002/0154272 | A1 | 10/2002 | Shevlin | 351/237 |
| 2002/0163482 | A1 * | 11/2002 | Sullivan | 345/6 |
| 2003/0016332 | A1 * | 1/2003 | Trajkovic et al. | 351/209 |
| 2003/0067421 | A1 * | 4/2003 | Sullivan | 345/6 |
| 2003/0086062 | A1 * | 5/2003 | Shevlin | 351/210 |
| 2003/0142042 | A1 | 7/2003 | Tidwell et al. | 345/8 |
| 2003/0197933 | A1 | 10/2003 | Sudo et al. | 359/464 |
| 2004/0135974 | A1 | 7/2004 | Favalora et al. | 353/10 |
| 2004/0207810 | A1 | 10/2004 | Nishihira et al. | 351/200 |

FOREIGN PATENT DOCUMENTS

| | | |
|---|---|---|
| GB | 02390909 | 1/2004 |
| JP | 2002101430 | 4/2002 |
| JP | 2004144874 | 5/2004 |
| WO | WO 9641227 | 12/1996 |
| WO | WO 0144858 | 6/2001 |

OTHER PUBLICATIONS

Dolgoff, G. "True Depth™: a new type of true 3-D volumetric display system suitable for CAD, medical imaging, and air-traffic control." Database Inspec Online. The Institution of Electrical Engineers, Stevenage, GB 1998 & Projection Displays IV Jan. 27-29, 1998 San Jose, CA. USA vol. 3296, pp. 225-230.

Hutley, M.C., and R.F. Stevens. "Use of diffracting optics in metrology and sensing." Centre for Mechanical and Optical Technology, National Physical Laboratory. Teddington TW11 0LW, U.K. SPIE vol. 3099; 0277-786X Jun. 18-20, 1997.

Lamb, Gregory M. "Return of 3-D—and no goofy glasses." Christian Science Monitor <http://csmonitor.com/2005/0421/p14s02-stct.html> from the Apr. 21, 2005 edition.

McQuaide, Sarah C., Eric J. Seibel, Robert Burstein, and Thomas A. Furness III. "Three-dimensional virtual retinal display system using a deformable membrane mirror." Human Interface Technology Lab, University of Washington; SID 02 Digest pp. 1-4, May 2002.

Peli, Eli, T. Reed Hedges, Jinshan Tang and Dan Landmann. "A Binocular Stereoscopic Display System with Coupled Convergence and Accommodation Demands." The Schepens Eye Research Institute, Harvard Medical School, Boston, MA. USA SID 01 Digest pp. 1296-1299, Jun. 2001.

Schowengerdt, Brian T., Eric J. Seibel, John P. Kelly, Nick L. Silverman, and Thomas A. Furness III. "Binocular retinal scanning laser display with integrated focus cues for ocular accommodation." Proceedings of SPIE-IS&T Electronic Imaging, SPIE vol. 5006 (2003).

Sullivan, Alan. "3-Deep: New displays render images you can almost reach out and touch." Spectrum Online, Apr. 2005 <http://www.spectrum.ieee.org/WEBONLY/publicfeature/apr05>.

Thibos, Larry N., PhD., FAAO and Arthur Bradley, PhD. "Use of Liquid-Crystal Adaptive-Optics to Alter the Refractive State of the Eye." Optometry and Vision Science, vol. 74, No. Jul. 7, 1997.

Watt, Simon J., Kurt Akeley, Ahna R. Girshick, and Martin S. Banks. "Achieving near-correct focus cues in a 3-D display using multiple image planes." School of Psychology, University of Wales Bangor, LL57 2 AS, United Kingdom; Microsoft Research: Asia, Beijing Sigma Center, No. 49, Zhichun Road, Beijing, China 100080; School of Optometry, 360 Minor Hall, University of California, Berkeley, CA USA 94720, Jun. 2004.

* cited by examiner

MATERIALS AND METHODS FOR SIMULATING FOCAL SHIFTS IN VIEWERS USING LARGE DEPTH OF FOCUS DISPLAYS

RELATED APPLICATIONS

This application is the U.S. national phase of international application, 371 of PCT/US03/07214, filed Mar. 7, 2003.

This application is based on a co-pending provisional application, U.S. Ser. No. 60/365,130, filed on Mar. 15, 2002, the benefit of the filing date of which is hereby claimed under 35 U.S.C. § 119(e).

FIELD OF THE INVENTION

The present invention generally pertains to a method and a display for conveying depth in a real or virtual image, and more specifically, pertains to selectively applying blur cues to images portrayed on a large depth of focus (DOF) display, based on the accommodation (focus) or vergence of the viewer's eye, to increase the perception of depth by the viewer.

BACKGROUND OF THE INVENTION

The world, as we experience it, is three-dimensional (3-D). However, although we experience a 3-D world, our senses do not directly receive 3-D data about the world. Instead, the optics of each eye project a two-dimensional (2-D) image onto the surface of the retina, and the visual system must infer data about the missing third dimension (i.e., depth) from those 2-D images and from various supplementary depth cues. These depth cues include the oculomotor cues of vergence and accommodation, and the stereoscopic cue of binocillar disparity.

Vergence: When a person's gaze is shifted to an object, the person's eyes move to fixate on the object, that is, to place the retinal image of that object on the center of each eye's retina (the fovea), where the resolution of the eye is the highest. Oculomotor cues involve the sensing of the position of muscles in and around the eyes. One oculomotor cue, vergence, refers to the phenomenon that lines of sight of the eyes are approximately parallel to one another when they are fixating on a very distant object, and the eyes rotate in toward each other (i.e., converge) as they fixate on closer objects. The brain receives sensory feedback regarding the relative eye positions, and this information serves as a depth cue.

Accommodation: Like most cameras, the human eye has a limited DOF. When viewing a real scene, not every object in the scene is in focus at any given time. Instead, the viewer accommodates (adjusts the focus of the eye) to bring objects at various distances into focus. For instance, if the viewer accommodates to an object that is one meter away, the retinal image of an object that is 20 meters away is blurry. The farther away an object is from the focus point of the viewer, the blurrier the retinal image of that object is.

The eye possesses a two part optical system. The cornea provides the majority of refraction (approximately 70 percent), but its refractive power is fixed. The crystalline lens sits behind the cornea, and its shape can be altered to increase or decrease its refractive power.

When a fixated object is close to the observer, the ciliary muscles of the eye contract in order to make the crystalline lens more spherical and increase its refractive power, so that the image of the object is brought into focus on the retina. When a fixated object is far from the observer, the ciliary muscles of the eye relax, thereby flattening the lens and decreasing its refractive power (measured in diopters) so that the image of the object is brought into focus on the retina. Dioptric blur provides negative feedback that the accommodation control system uses when trying to accommodate to an object at a given distance at a given point in time. If a person looks at an object at a novel depth, it will be blurred from the initially inaccurate state of accommodation. If the system begins to shift accommodation in one direction, and the object becomes more blurry, this blur feedback causes the system to reverse the direction of the accommodation shift. If, instead, the object becomes clearer, then accommodation continues to shift in the same direction. If the shift in accommodation overshoots the point of best focus, this manifests as increased blur, and the shift in accommodation reverses direction and slows. These shifts in accommodation continue until the blur feedback is minimized (the object comes into best focus). The process is dynamic, and the eye constantly monitors blur feedback and makes corrections in accommodation at rates up to 5 Hz. This process of natural viewing and focusing is known as closed-loop accommodation, because the blur feedback loop is intact (or "closed"). The brain receives feedback about the state of activity of the ciliary muscles, providing the viewer with information about the depth of the object being viewed.

Some viewing conditions artificially increase the DOF of the eye. For instance, if a scene is viewed through a small pinhole, then both distant and near objects are in focus at the same time. Under such conditions, the negative feedback of dioptric blur is removed or substantially decreased, and accommodation is said to be "open-loop" (because the feedback loop is interrupted). Under open-loop accommodation conditions, the viewer can accommodate from extremely near to far without a significant change in the retinal image of the scene. Some video displays can be made to have a very large DOF. As one example, the virtual retinal display (VRD) described in U.S. Pat. No. 5,467,104 can have a large DOF, producing an open-loop accommodative response in users. Other large DOF displays can be fabricated and methods presented in this document are applicable to all possible large DOF displays.

Vergence and Accommodation are Synkinetic: When one shifts one's gaze to an object at a given depth, the resultant vergence and accommodation responses are highly correlated. Not surprisingly, the accommodation and vergence mechanisms are synkintetic (an involuntary movement in accord with one mechanism is triggered when a movement in accord with the other mechanism occurs). This linkage can be observed in infants between three to six months old, suggesting a biological predisposition for the synkinesis. When the eye accommodates to a certain depth, the vergence system is automatically driven to converge to the same depth. Conversely, when the eye converges to a certain depth, the accommodation system is automatically driven to accommodate to the same depth. These cross couplings between accommodation and vergence are referred to as convergence driven accommodation and accommodation driven vergence.

Binocular Disparity and Stereopsis: Another depth cue is binocular disparity. Because a small distance separates the two eyes, they have slightly different viewpoints, and hence different retinal images. In stereopsis, the visual system compares the images from the left and right eye, and makes inferences about the depth of objects based on disparities between the retinal locations on which the images of the objects fall. This depth cue has been exploited in stereographic displays (including Head Mounted Displays (HMDs)), which present different images to each eye.

An object at the point of fixation falls on corresponding points of the retina (the center of the fovea, in this case). Other objects at approximately the same depth as the fixated object will also fall on corresponding points of the retina. The imaginary curved plane that describes the area of space that will fall on corresponding retinal points is referred to as the horopter. Objects behind the horopter will be shifted toward the left side of the retina in the right eye and toward the right side of the retina in the left eye (i.e., the images are shifted toward the nose). Objects in front of the horopter will be shifted toward the right side of the retina in the right eye and toward the left side of the retina in the left eye (i.e., the images are shifted toward the ears).

Interaction between Accommodation, Vergence, and Stereopsis: All of these depth cues interact. As mentioned previously, accommodation and vergence are synkinetic. Vergence and stereopsis interact. In order to stereoscopically fuse objects at different distances, the eyes must converge to fixate upon those objects. The relative distance between right and left object images is greater for objects in the foreground of a stereographic image than for objects in the background of the image. As viewers use stereographic displays and look at objects in the foreground and background of the displayed scene, they must dynamically shift vergence.

Accommodative Response to Current Non-Stereographic Video Displays: Research has indicated that viewers do not accurately focus their eyes on standard (non-stereographic) video displays (e.g., liquid crystal displays (LCDs) and cathode ray tubes (CRTs)). Their focus is, instead, biased in the direction of the resting point of accommodation (the degree of accommodation of the lens when a person is in a dark room or is otherwise deprived of an adequate visual stimulus). This resting point is not at the ciliary muscle relaxation point, which would produce a lens refractive power of 0 diopters, and varies between individuals. This inaccurate accommodation causes a video display to become somewhat blurred, and is thought to be a major contributor to the eye fatigue and headaches that often accompany prolonged video display use. It would thus be desirable to reduce these inaccuracies in accommodation and thereby reduce a cause of eye strain.

Stereographic Video Displays: A number of video display manufacturers have attempted to increase the immersion and amount of information in the display by creating stereographic displays (the term stereoscopic display is often used interchangeably with this term). One example of a stereographic display is the stereoscopic head mounted display (HMD). Typically, HMDs consist of a helmet or set of goggles, with a separate small LCD screen set in front of each eye. Lenses are mounted between each LCD and eye and are typically configured to place the image at optical infinity. The images displayed on each LCD are not identical, but instead represent slightly different camera viewpoints. The left LCD displays the left half of a stereo image pair and the right LCD displays the right half.

Another example of this display is the stereographic head tracked display (HTD). Two versions of HTD are common. With some HTDs, a user dons lightweight LCD shutter glasses with lenses that become opaque or transparent in synchrony with the frames displayed on a large table or wall mounted 2-D video display. When the shutter over the left eye is opened, the shutter over the right eye closes, and the left half of a stereoscopic image pair is flashed on the display. When the shutter over the left eye then closes, the shutter over the right eye opens, and the right half of the stereoscopic image pair is displayed. The opening of shutters alternates from side-to-side in quick succession, and the display synchronously shifts between showing left and right views, with every other frame displayed on the monitor reaching each eye.

In other implementations of an HTD, the user wears glasses in which the left lens is polarized along an axis orthogonal to that of the right lens (e.g., the left lens is polarized vertically, while the right is polarized horizontally). The user looks at a screen, upon which the left stereo image has been projected with light polarized along one axis, and upon which the right image has been projected with light polarized along the other axis. Each lens admits only the light reflected from the screen that is of the matching polarization, so each eye is presented with a different image. Other implementations of stereographic displays include autostereoscopic displays, which enable users to view stereo images without wearing any special glasses.

With all of these stereoscopic displays, the left eye receives only the left stereo image, while the right receives only the right stereo image, giving the user the illusion that he/she is looking into a virtual scene with two eyes at normal eye separation.

Current Stereographic Displays Violate Accommodation-Vergence Synkinesis: Current stereographic displays, especially HMDs, tend to cause profound eye fatigue, often accompanied by headache. Research suggests that this eye fatigue is, in part, the result of an incompatibility between the construction of the display and the biology of accommodation. Specifically, the displays elicit a mismatch between the depth information provided by accommodation and that provided by vergence. The displays have a fixed plane of focus (usually at optical infinity, or 0 diopters) making it necessary for the viewer's eyes to maintain a static level of accommodation while using the display. If the viewer shifts his/her level of accommodation, the display becomes out of focus. Nonetheless, stereo displays also require that the viewer dynamically change the vergence of his/her eyes to binocularly fuse objects at different apparent distances. Accommodation and vergence are yoked—that is, they are synkinetically linked, such that when a person's eyes converge, the eyes also tends to accommodate near, and when a person's eyes deconverge, they tends to accommodate far. These displays violate this linkage and require a viewer to simultaneously converge his/her eyes while maintaining a fixed level of accommodation. Accordingly, it would be desirable to provide a display that allows accommodation and vergence to shift synchronously, just as they do in natural viewing, and thus removes the primary source of stereo display eye strain and loss of visual acuity.

SUMMARY OF THE INVENTION

The present invention employs a display method that, based on a measured or estimated accommodation (focus) of the viewer, selectively applies blur cues to images portrayed on a large DOF display. When using such a display in accord with the present invention, a viewer can look at a displayed scene (real or virtual) and naturally shift focus between objects in the scene. By accommodating to different objects, which may be at different distances from a real or virtual viewpoint, those objects come into sharp focus. The method gives the viewer the illusion of viewing a scene with objects at different depths in the scene, and in doing so, simulates natural viewing conditions. This method dramatically increases the interactivity of the display, which enhances the perceived realism of the display. The ability to accommodate to objects portrayed on a display can increase the impression of realism and the feeling of immersion in a displayed scene, reduce eye strain (because the viewer does not maintain static accommodation), and reduce computation time, since a computing device coupled to drive the display needs to devote fewer resources to render an object that is out of focus. When applied to stereographic displays, the system allows accommodation to move in synchrony with ocular vergence, reducing eye strain and the loss of visual acuity that results from a mismatch of accommodation and vergence angle.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Construction:

The following components are needed to implement the present invention: (1) a display with a large DOF; (2) means for the (direct or indirect) measurement of accommodation; and, (3) a computing device that, at a minimum, receives the accommodation measurements, and can affect the input to the large DOF display. Each of these components is discussed in further detail below.

Large DOF Displays:

Any display with a large DOF can be used in this method. Several displays that fit this description are summarized here, but this does not exclude other possible displays with a large DOF. The provided examples of large DOF displays are not comprehensive, but rather serve as examples to illustrate the general principle of a large DOF display. Other large DOF displays can be used in place of the examples discussed below.

Figure 1:
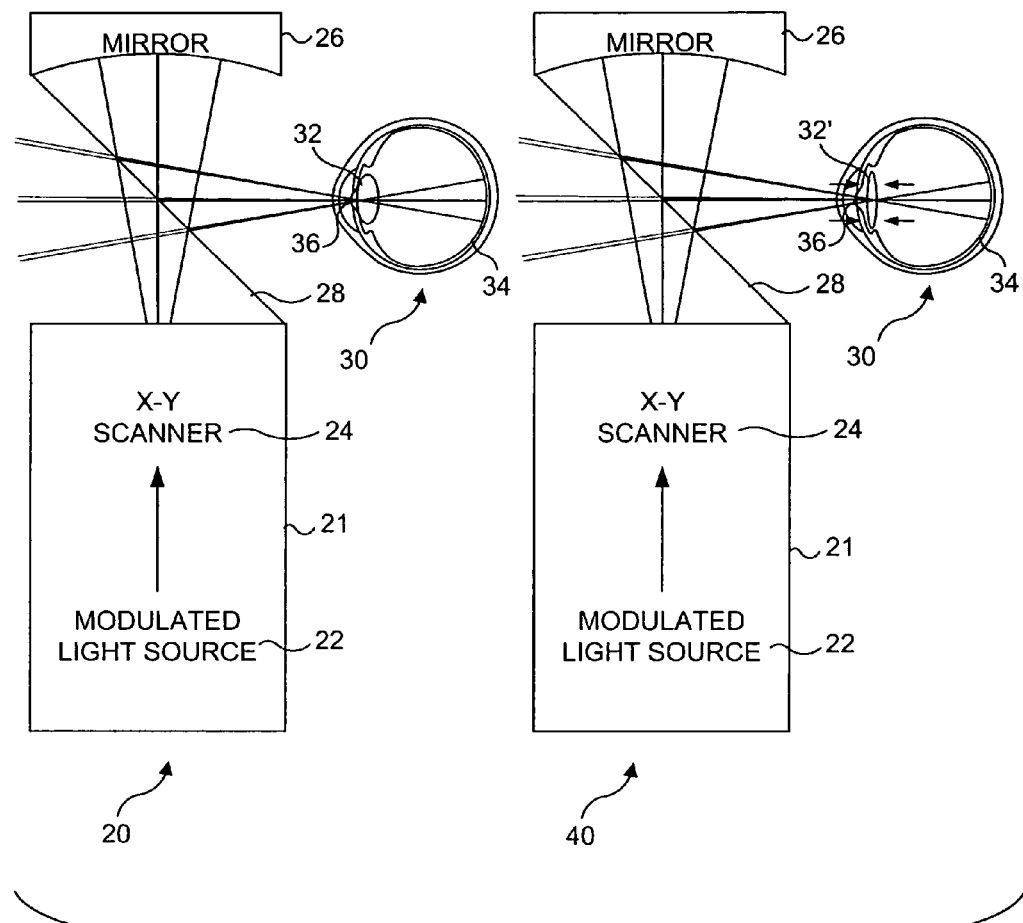
FIG. 1 is a schematic diagram that illustrates how changes in the shape of a crystalline lens do not affect the focus of VRD images, due to the large DOF created by narrow beams of light forming a narrow exit pupil in an eye.

VRD: The VRD is one type of display that can be used as a large DOF display in the present invention. As shown in FIG. 1, the VRD used preferably comprises a scanned light display 21 (also known as a retinal scanning display, a scanned laser display, a scanning light display, a scanning laser display, a retinal scanned light display, a retinal light scanning display, a flying spot display). Scanned light display 21 includes a modulated light source 22 and an X-Y scanner 24. Light from the scanned light display is directed toward a concave mirror 26 through a beam splitter 28. The beam splitter 28 directs light reflected from concave mirror 26 toward a viewer's eye 30. Because all of the rays projected from the VRD converge at a very small exit pupil 36, the images it projects have a large DOF. The display creates the equivalent of a "pinhole" aperture at its exit pupil, enabling it to project a clear image on the back of a viewer's retina 34 independent of the degree of accommodation of a viewer's lens 32. In a view 40, a viewer's lens 32' is flatter, showing an accommodation to view an image that is farther away compared to lens 32 in a view 20, where lens 32 appears much rounder, as would be the case in viewing an image that is closer. However, because the image viewed by eye 30 is provided with a large DOF, the light rays that form the image are in focus on retina 34 in both view 20 and view 40. Because all planes remain in similar focus throughout the range of accommodation of the viewer's eye, a viewer is provided with little or no feedback to the accommodative system, giving rise to open-loop accommodation.

Small Aperture Viewing: The DOF of any display can be increased by viewing that display through a small aperture (such as a "pinhole" in a sheet of foil). Apertures of 0.5 mm diameter, or smaller, work best to generate open-loop accommodation while viewing a display, but apertures between 0.5 mm and 2 mm in diameter will partially open the loop, producing a satisfactory result. Viewing a display through a small aperture reduces the total amount of light entering the eye, so it is preferable to use fairly bright displays. If the device used to monitor accommodation uses non-visible wavelengths of electromagnetic radiation, the small aperture can be in a filter that is opaque to visible light, but transmits infrared light or some other non-visible wavelengths of electromagnetic radiation.

Figure 2:
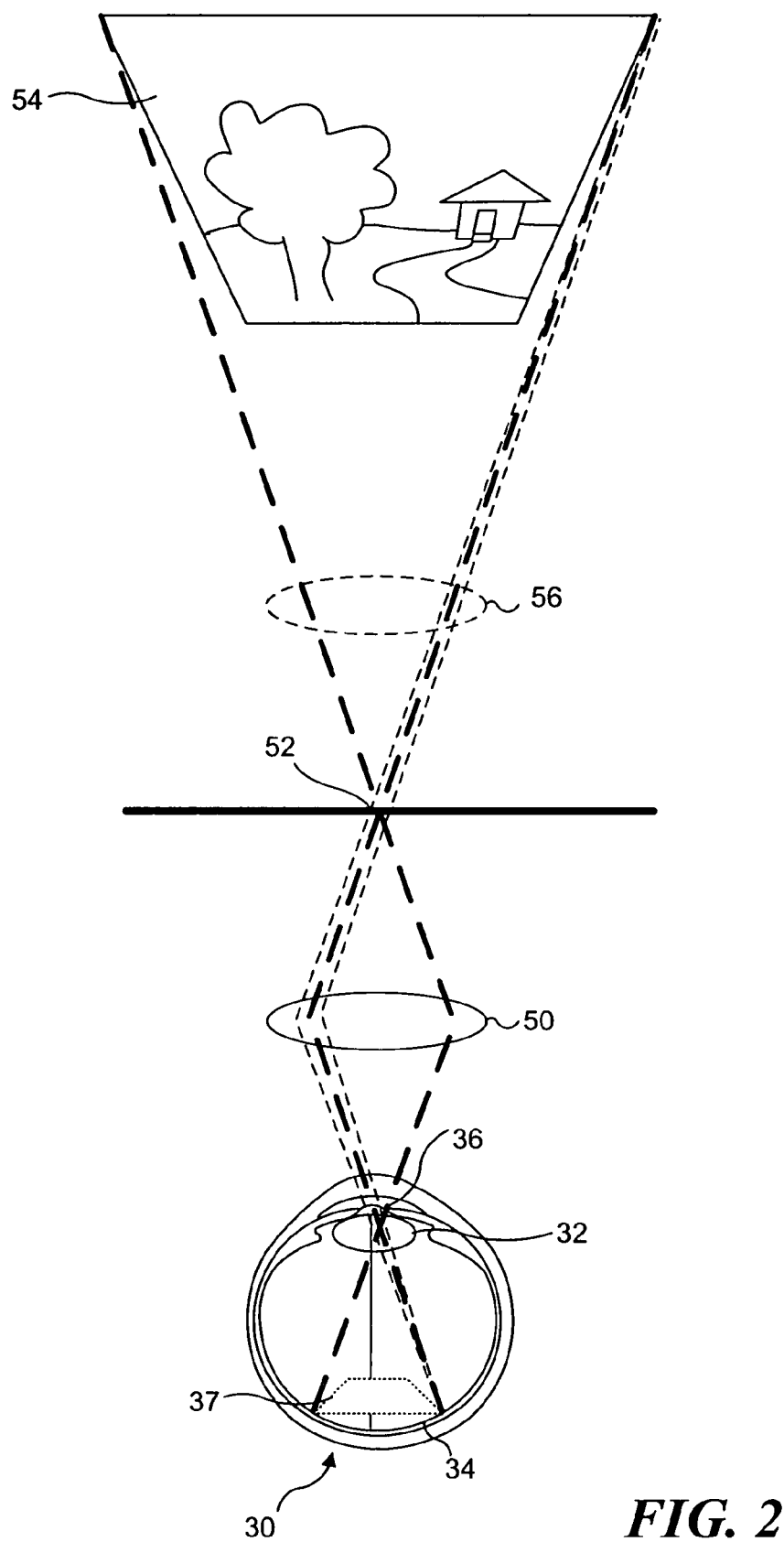
FIG. 2 is a schematic view illustrating one method in accord with the present invention, for creating a large DOF display.

Alternate Method for Creating a Large DOF Display: Very bright displays (including, but not limited to LCD projectors) can be modified to become large DOF displays. As shown in FIG. 2, a pinhole aperture 52 can be placed at some point in front of an image source 54 (e.g., an LCD). Depending on the variety of image source or video projector actually used, the optics of the projector may be in front of or behind the small aperture, or may be removed completely. The beams emerging from the small aperture can be collected with optics 50 (which may comprise one or more lenses) that redirect the beams to form a small exit pupil 36 (an image of pinhole aperture 52). When the pupil of a viewer's eye 30 is placed to coincide with exit pupil 36, the viewer sees a Maxwellian view of image 37 on retina 34 of the projected image, with a large DOF.

To adjust the divergence angle of the beams passing through the small aperture, an additional set of optics 56 may optionally be placed in front of the aperture. FIG. 2 also shows the beam divergence (using the dotted lines on each side of one of the beams shown with dash lines). By comparing the beam characteristics in FIG. 2 with those of the VRD in FIG. 1, it can be seen that this display can be analogous to a parallel scan version of a scanned light display. That is, whereas the VRD scans a narrow beam serially, this alternative display projects all of the beams in parallel. It should be understood that the method (and variations thereof) described in this document for one of these displays is also applicable to the other.

Means for Monitoring Accommodation:

Concurrent with the viewing of the large DOF display, the accommodation of the viewer must be monitored, to implement the present invention. A number of techniques can be used to monitor accommodation directly or indirectly. Some applicable devices include, but are not limited to, IR optometers. These devices objectively determine the degree of accommodation by analyzing the reflection of the IR light that they shine into a person's eye. Accommodation monitoring devices vary in the frequency with which they can make measurements. The more frequently they can make measurements, the better suited they are for use in the present invention.

Direct Measurements of Accommodation: One example of an IR optometer that can be used in this approach is the Welch Allyn, Model 14010 SureSight™ autorefractor. However, any similar device that provides information about a viewer's level of accommodation can be used in the place of the SureSight™ autorefractor. The SureSight™ autorefractor continuously measures the refractive power of the eye at 5 Hz. The measurement range for spherical refractive power is from +6.0 diopters to −5.0 diopters, and an additional measurement of cylindrical refractive power from 0 to +3.0 diopters along the axis of the cylinder is provided. One index of the level of accommodation of the viewer is the spherical refractive power; however, the spherical equivalent (spherical refractive power added to half of the cylindrical refractive power) generally provides a better index. The SureSight™ autorefractor has a working distance of 14 inches.

Figure 3:
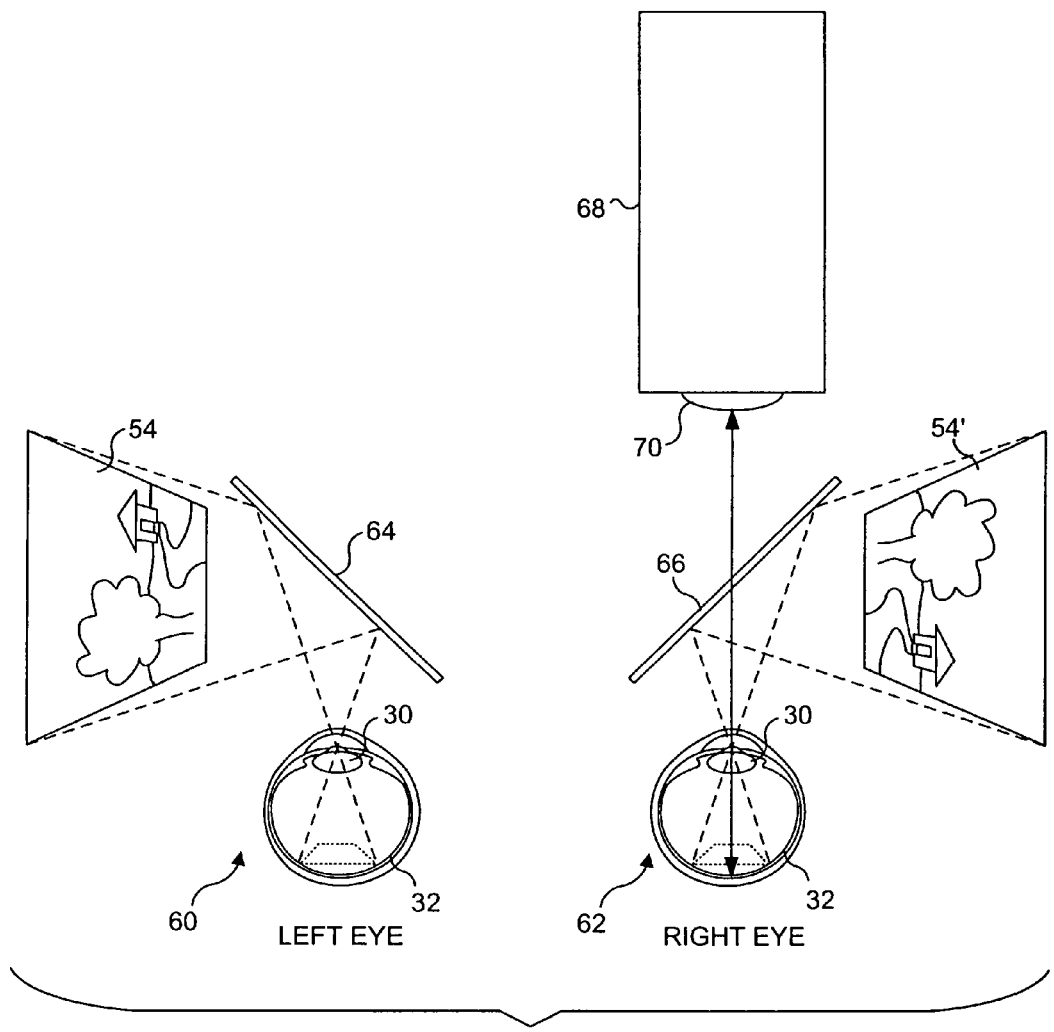
FIG. 3 is a schematic diagram showing one embodiment for configuring a large DOF display and an accommodation monitoring device.

The SureSight™ autorefractor is most accurate when its IR beam can enter into the eye along the eye's visual axis. A number of alternate configurations allow this to occur, and a subset of these configurations is illustrated in the embodiments of the present invention shown in FIGS. 3-7. In each of these Figures, a general layout of components is shown for a binocular display. These Figures are also helpful in visualizing the layouts for monocular displays by referring only to the right side of each Figure. One configuration that enables accommodation to be monitored while a viewer uses a large DOF display requires placing accommodation monitoring device 68 (such as the SureSight™ autorefractor or an equivalent) directly in front of the viewer's eye to directly transmit light from the eye through an optional lens 70. The image from the large DOF display is reflected into the eye with a beam splitter 66 (or cold mirror), as shown in FIG. 3. The accommodation monitoring device takes accommodation measurements of an eye 62 (the viewers right eye in this example, but optionally a left eye 60 can be used), while the eye views the reflection of a large DOF display 54' in the Maxwellian view. The light beams from display 54' forms a small exit pupil or aperture that is aligned with the entrance pupil of the eye. Although two accommodation monitoring devices could optionally be used, it is not necessary to do so, because the accommodation levels of the right and left eyes are linked. Thus, for the viewer's left eye 60, only a beam splitter 64 (or mirror) is used to reflect large DOF display 54 into the left eye.

Figure 4:
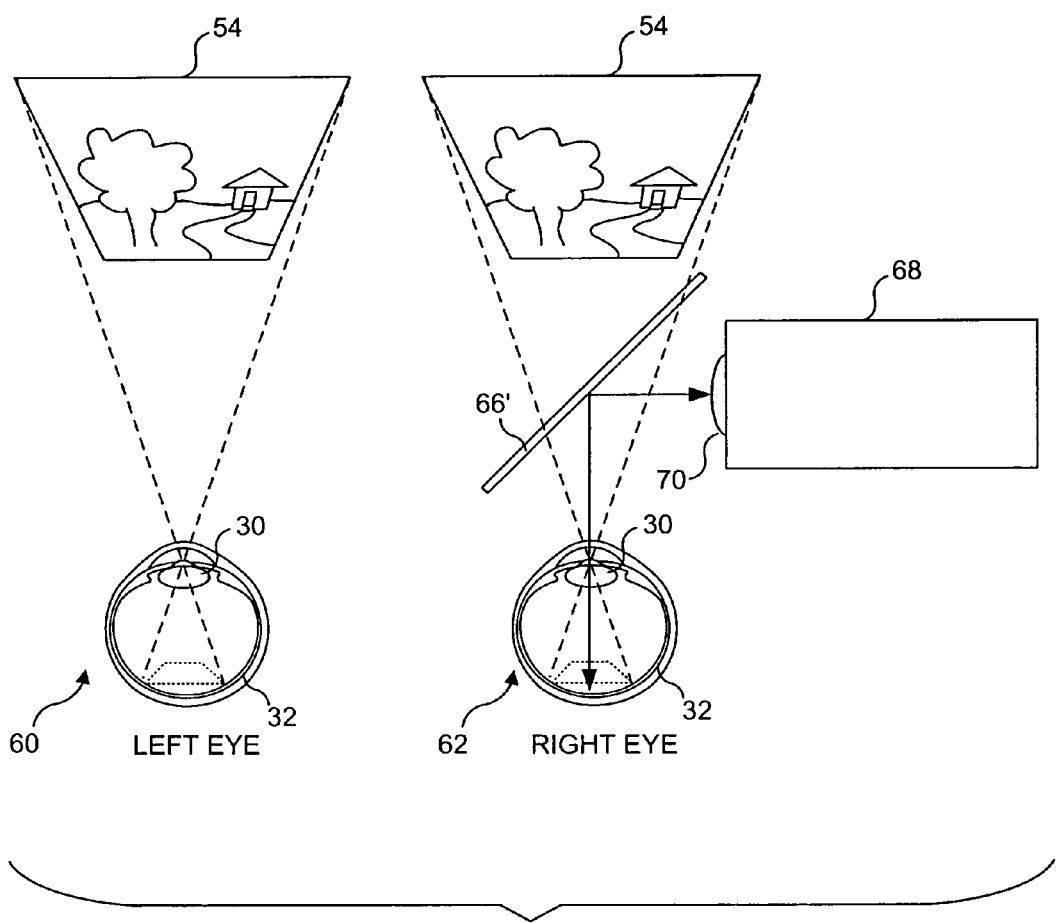
FIG. 4 is a schematic diagram showing another embodiment for configuring a large DOF display, with the accommodation monitoring device disposed perpendicular to the axis of the eye.

Alternatively, accommodation monitoring device 68 is placed perpendicular to the line of sight of the viewer, as shown in the embodiment of FIG. 4. A beam splitter or hot mirror 66', which in this embodiment preferably reflects only non-visible wavelengths of light but permits visible wavelengths to pass unimpeded, is mounted at a 45 degree angle, at the intersection between a viewer's line of sight and a measurement axis of the accommodation monitoring device. This configuration enables the viewer to look directly through the beam splitter and into the large DOF display, which is mounted along the viewer's line of sight, while the accommodation monitoring device continuously measures the level of accommodation via the reflection from the beam splitter.

Figure 5:
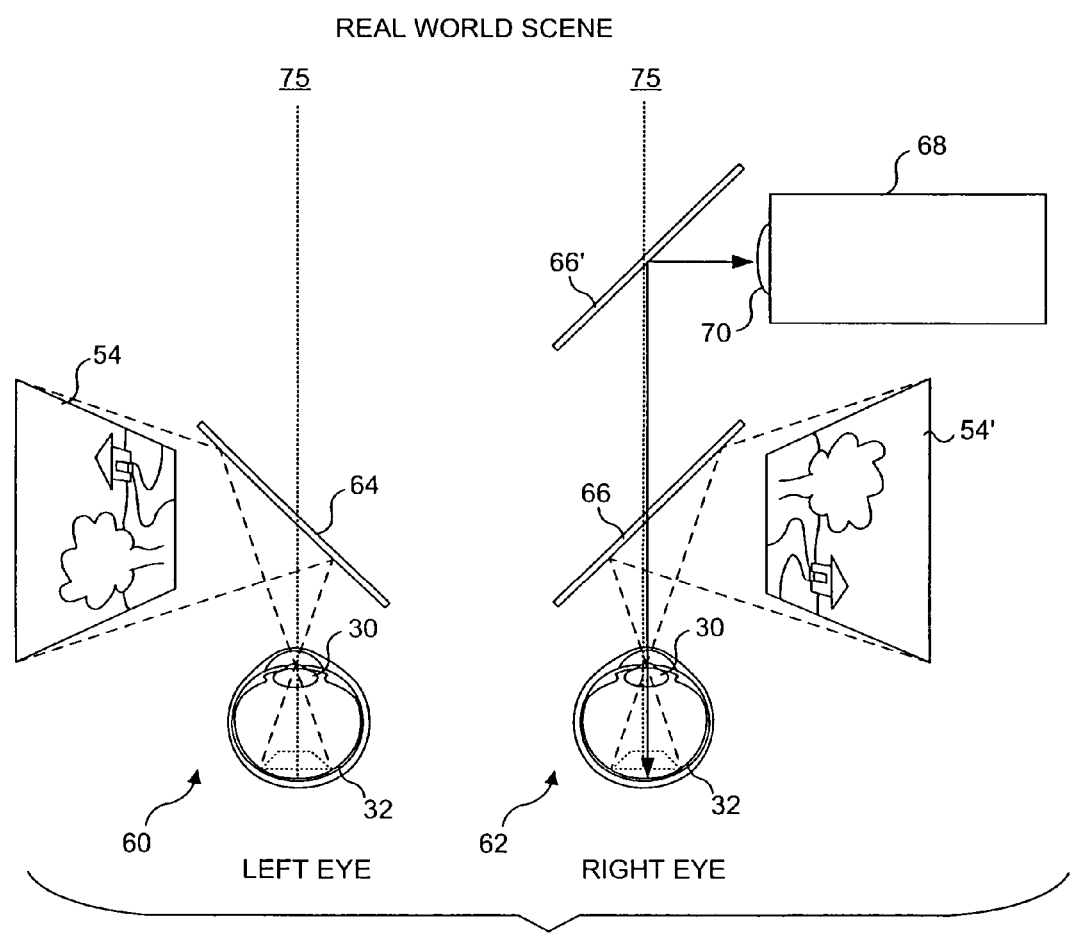
FIG. 5 is a schematic diagram showing yet another embodiment, with both the large DOF display and accommodation monitoring device disposed perpendicular to the axis of the eye, allowing the viewer a line of sight to the real world for augmented reality applications (virtual data superimposed over real world data)

In another embodiment, which is shown in FIG. 5, both accommodation monitoring device 68 and large DOF display 54' are disposed perpendicular to the line of sight of the viewer's eye 62. Beam splitter 66' reflects the non-visible measurement signal from accommodation monitoring device 68 into the eye and also reflects the measurement signal from the eye back into lens 70 of the accommodation monitoring device. Beam splitter 66 (or a cold mirror), which transmits the non-visible measurement beam, reflects light from large DOF display 54' into eye 62, enabling the viewer to superimpose the displayed images with real objects 75.

Figure 6:
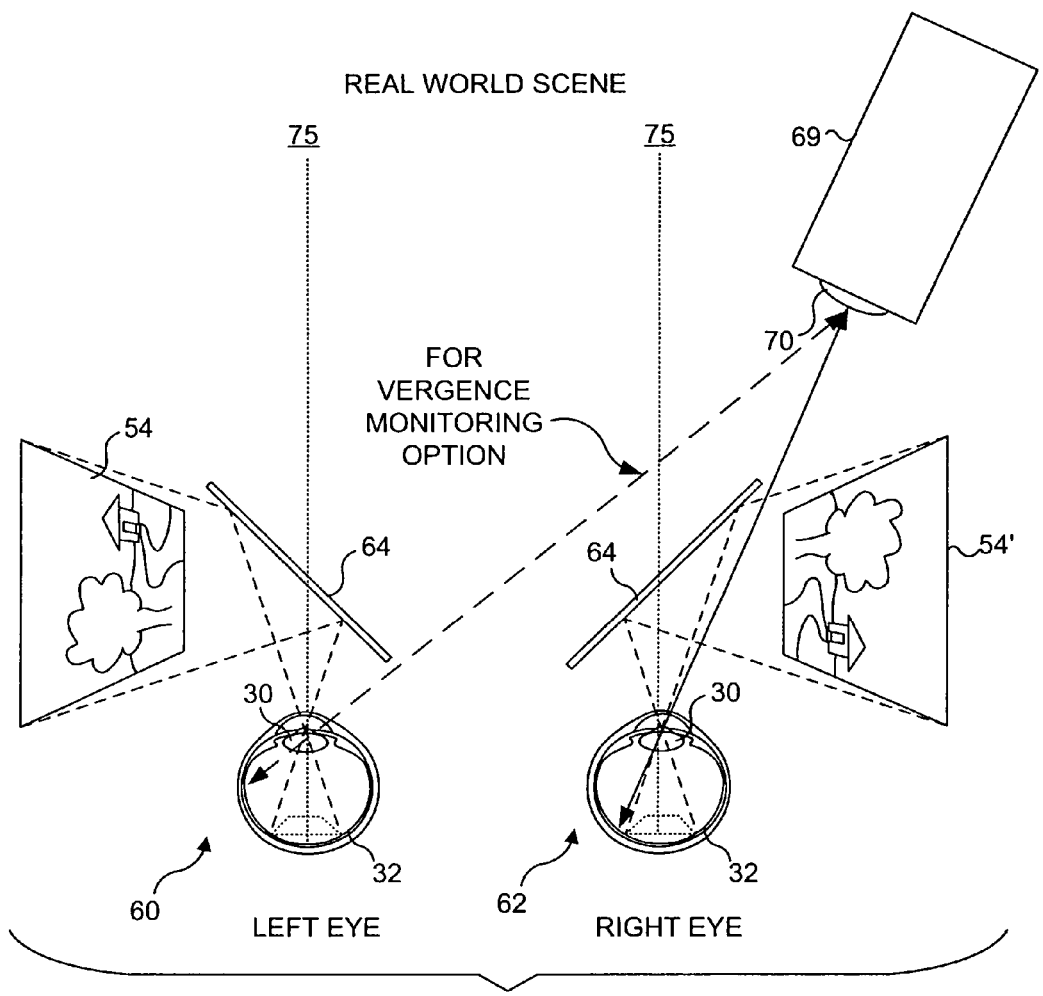
FIG. 6 illustrates an embodiment in which a device to monitor accommodation is disposed off-axis, and shows that an optional binocular monitoring of vergence (relative to both eyes) can be made with a suitable device, to determine accommodation, while the viewer has a line of sight to the real world for augmented reality applications.
Figure 7:
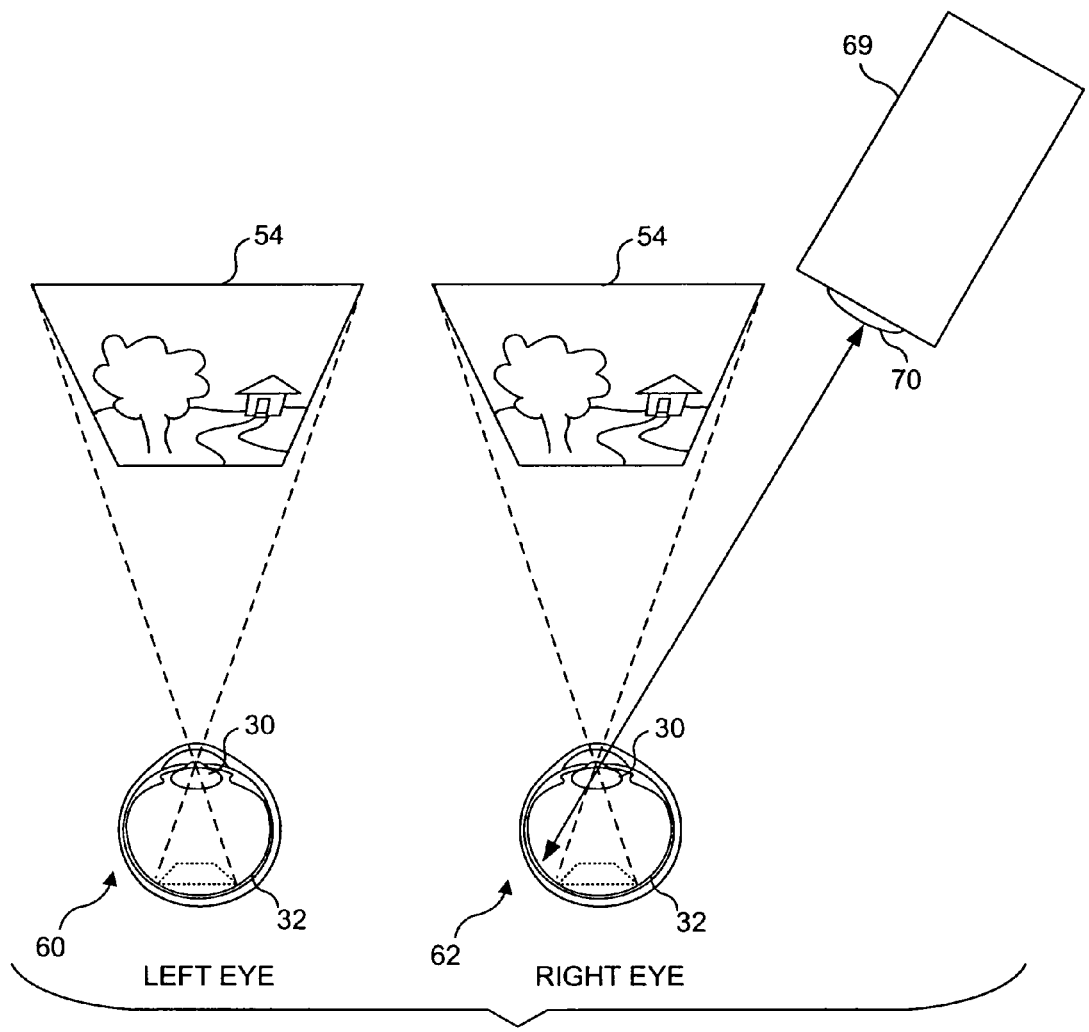
FIG. 7 is another embodiment in which an off-axis monitoring of accommodation is made.

Other accommodation monitoring devices are accurate even when used off-axis. Accommodation monitoring device 69, which is of this type, can be mounted at an angle from the line of sight of the eye and monitor accommodation while the viewer views large DOF display 54' via a reflection in beam splitter 64 (or a mirror) or directly, as shown respectively, in FIGS. 6 and 7. In FIG. 6, as in FIG. 5, the viewer can optionally view real objects 75 through the display apparatus, while viewing superimposed displayed images.

Indirect Estimates of Accommodation: Because vergence and accommodation are synkinetically linked, an alternative to measuring accommodation directly is to monitor the vergence angle of the eyes, and thereby indirectly estimate the accommodation of the viewer. Because changes in accommodation and vergence are highly correlated, a direct measure of vergence provides a satisfactory estimate of accommodation. Many devices are available that can quickly track eye movements (and thereby calculate vergence angle), and such devices are a relatively cheap alternative to devices that measure accommodation directly. In any of FIGS. 3-7, a vergence monitoring device can be substituted for the accommodation monitoring devices 68 or 69.

Computing Device:

A computing device 132 (shown in FIG. 10) with custom software comprising a plurality of machine instructions that are stored and loaded in memory for execution by a processor in the computing device, or a device with a custom hardware board (not shown) that implements these steps, receives measurements from the accommodation monitoring device and converts those measurements into measurements of accommodative power. The algorithm accesses a database, identifies the image that best corresponds to a measured accommodative power, and outputs that image to the large DOF display for immediate display to the viewer. This process is repeated each time the accommodation monitoring device collects a new accommodation measurement (e.g., five times per second using the SureSight™ autorefractor for making accommodation measurements).

General Description of Method

Figure 8:
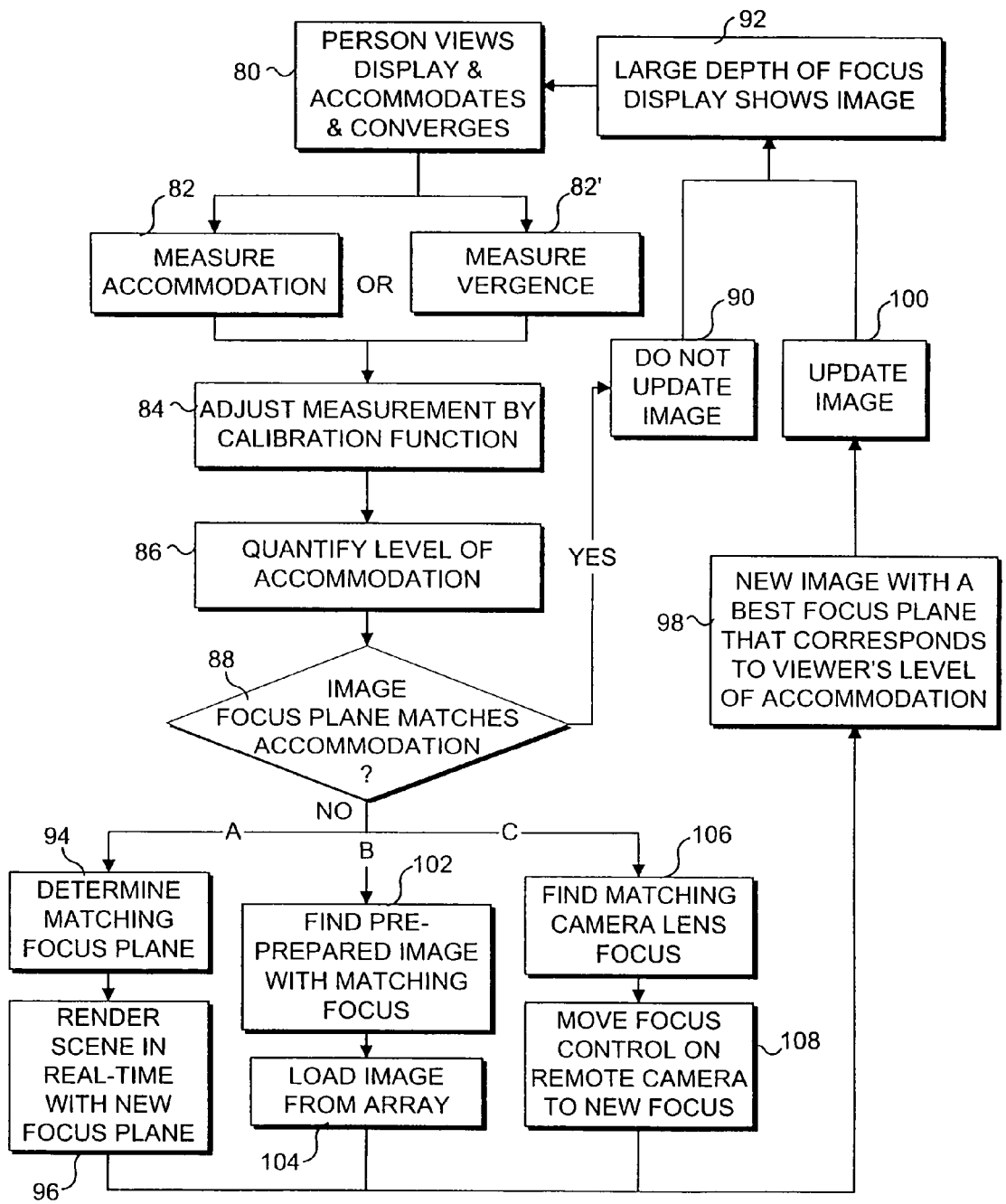
FIG. 8 is a flow chart showing the logic employed in the present invention to select and display an image with an apparent focus plane that corresponds to a viewer's level of accommodation.

The present invention uses simulated dioptric blur cues to "close" open-loop accommodation to a large DOF display. That is, a viewer using our system can look at a displayed scene (real or virtual) and naturally shift focus between the objects in that scene as if he or she were actually there. This effect is accomplished by the following means:

The method employs a repeating cycle of steps, which are illustrated in FIG. 8. The cycle may begin with any of the steps, and within one full iteration of the cycle, the blur information will be brought into accordance with the level of accommodation. Each iteration of the cycle updates the blur information and thus, enables the blur content of images to dynamically change in accordance with the viewer's accommodation.

While a person views the large DOF display, the accommodation level of the viewer is continuously monitored with an external instrument, such instrument as the IR autorefractor, which was discussed above. However, as noted above, any accommodation monitoring device that provides information about the level of accommodation can be used in the place of the autorefractor.

The accommodation measurements provide input for the computing device that selectively blurs objects in the scene, based on the current or anticipated level of the viewer's accommodation. For example, if the viewer accommodates to a distance of five meters, the computing device leaves objects near the five meters point in the scene unblurred and blurs other objects in proportion to their distance from the five meters focus point. The computing device outputs the selectively blurred image to the large DOF display.

The viewer sees an updated view of the scene with appropriate blur information. Although the displayed image remains sharply optically focused on the viewer's retina at all times, the viewer perceives portions of the image to be blurry as if they were optically defocused. As the viewer shifts accommodation, the display dynamically adjusts the blur cues (bringing some objects into focus, and others out of focus) to match the accommodation level.

The logical steps used in this process are shown in FIG. 8. In a step 80, the person views the display and the person's eyes accommodate and converge on an element in the large DOF display. The accommodation of the viewer's eye(s) is measured in a step 82. Alternatively, the system measures the vergence (or gaze direction) of the viewer's eyes in a step 82' (and can then optionally compute the accommodation power based on the vergence). In a step 84, the measurement made in step 82 or 82' is adjusted by applying a predetermined calibration function, as appropriate. The calibrated result from step 84 is then used to quantify the level of accommodation exhibited by the viewer's eye(s) in a step 86.

A decision step 88 determines if the image focus plane provided by the large DOF display matches the viewer's accommodation. If so, the logic proceeds with a step 90 that determines the image provided by the large DOF display need not be updated. Accordingly, in a step 92, the large DOF display continues to show the image (without any change in the image focus plane). However, if the results in decision step 88 indicate that the image focus plane does not match the viewer's accommodation as measured, the blur information in the image that is displayed must be altered.

There are a number of alternative means by which the computing device can control the blur information in the image. Three alternate paths (A, B, and C) are illustrated in FIG. 8, but other techniques can alternatively be used. Further details about these alternate methods employed by the computing device are discussed below. After one of these three approaches is used (i.e., after following the steps of path A, B, or C), the logic continues with a step 98 in which a new image is selected for display to the viewer, to provide the best focus plane corresponding to the current or anticipated level of accommodation by the viewer. A step 100 then updates the image to be displayed with the selected image, and step 92 displays the updated image on the large DOF display, as noted above. The logic then loops to step 80 to repeat the process.

Source Images:

A wide variety of images can be presented on the large DOF display. The source images of scenes can be obtained in a number of ways. A useful distinction can be drawn between two categories of images, i.e., the images presented on the large DOF display can depict either virtual scenes, or real scenes. A second useful distinction can be drawn between 2-D images derived from 3-D scenes in real-time, and pre-prepared 2-D images. The four combinations of these two categories lend themselves to different varieties of implementation. Each of these implementation variants is discussed in greater detail below, and for each implementation, a path in FIG. 8 (A, B, or C) sketches its logical implementation.

Virtual Scenes—Real-time Rendering: In connection with the logical steps of path A in FIG. 8, a virtual 3-D scene is created in or transferred into a 3-D modeling program. Three-dimensional rendering software can be used to render 2-D images of the virtual scene and add variable amounts of blur to selected virtual objects (sometimes referred to as rendering with "lens focus effects" or "DOF effects"). The 3-D rendering software simulates the limited DOF of natural vision by adding blur to those virtual objects that lie outside of a chosen plane of best focus. The plane of focus can be changed arbitrarily by a user or a program. In the preferred implementation for virtual scenes, the scene is rendered in real-time while the viewer uses the large DOF display and has his/her accommodation dynamically measured. Every time a new accommodation measurement is taken, the plane of best focus in the 3-D renderer is dynamically determined and shifted to match the current accommodation of the viewer in a step 94 of FIG. 8, path A. In a step 96, the 3-D rendering software is then used to render a scene or image with a new focus plane that matches that corresponding to the accommodation measured for the viewer. The logic then proceeds with step 98.

Using this implementation, the viewer can move and look around a virtual scene (using a joystick, mouse, motion trackers, or other input or pointing devices) and naturally accommodate to different objects in the virtual scene. The location of the viewer in the scene, the gaze direction, and accommodation of the viewer all are used to dynamically control the rendering options for the scene.

While high resolution realistic real-time rendering requires significant computational power, use of accommodation information in the present invention can substantially decrease the computational power that is required for rendering the images displayed. The accommodation information can be used as a level of detail (LOD) effect, reducing the demand on the processor. Other conventional LOD effects are based on the distance from the person's viewpoint to other objects in a virtual scene (distant objects are rendered at a lower resolution than close objects). In these implementations, the accommodation of the eye provides an additional cue for LOD effects. Only objects on the focal plane in the virtual scene need to be rendered at the maximum resolution and contrast. All other objects off the focal plane can be rendered at a lower resolution and contrast, since the objects' high resolution content is subsequently masked by blurring. The farther an object is from the focal plane, the lower the resolution and contrast that are required to render the object so that the object looks natural. This method of using a viewer's accommodation information as a LOD effect reduces the total processing power necessary to render realistic high resolution 3-D scenes.

Stereographic images (one for each eye) can be generated by rendering the virtual scene from two viewpoints. All of the methods described in this provisional patent can be applied to stereographic images. In addition, for all of the approaches described herein for practicing the present invention, cylindrical or spherical image formats (such as the Apple Corporation's Quicktime™ VR format), and 2½-D image formats can be used in place of 2-D images. Cylindrical or spherical image formats render a panoramic view of a scene and enable a viewer to rotate his/her virtual view of a scene without requiring the system to render separate images for each view rotation.

The present embodiment enables a viewer to dynamically rotate the view of virtual scene without the scene needing to be re-rendered. Under this embodiment, a new image only needs to be re-rendered when the accommodation level of the viewer changes or the viewer moves within the scene. Two and one-half dimensional image formats retain the z-axis (depth) information for each pixel of a rendered image. Many 3-D rendering software packages separate the rendering of the 3-D scene from the rendering of the focus effects. First, they render a 2½-D image from the 3-D scene, then they render a selectively blurred 2-D image from the 2½-D image. Using this method, the 3-D renderer only needs to render a new 2½-D image when the viewer moves within a scene or rotates the view. If the viewer changes accommodation, the 2½-D image remains the same, and only the focus effects applied to it are changed. In addition, a hybrid 2½-D cylindrical or spherical image format, in which a cylindrical or spherical image contains z-axis (depth) information, can also be used in place of 2-D images in the herein described methods. In this embodiment, the 3-D renderer need only render a new 2½-D image when the viewer moves through the scene or views moving objects. The focus effect only needs to be re-applied to the 2½-D image when the viewer accommodates—if the viewer rotates the view of the scene, the focus effect need not be updated. These methods reduce the total computation necessary to render a realistic high resolution 3-D scene.

Virtual Scenes—Pre-Rendering: A computationally efficient implementation, which is suitable for use in connection with path B in FIG. 8, renders a series of images from the virtual scene offline, but allows real-time control of the playback of the pre-rendered 2-D images. Before the viewer uses the large DOF display, a virtual scene is rendered into a number of 2-D images. In the simplest implementation of this embodiment, the objects in the 3-D scene and the virtual camera remain stationary across the series of rendered images. For each 2-D image, however, the location of the plane of best focus for the rendering effect is different. From the static scene, a continuum of images is generated, with the focus at optical infinity on one end of the continuum, and with the focus at a near point (e.g. 1 cm) at the other end. A one-dimensional (1-D) array of 2-D images is created and saved for future presentation. When the viewer uses the large DOF display and accommodates, the computing device selects the image from the array that was pre-rendered with a focal plane that matches the accommodation of the viewer, as indicated in a step 102 in FIG. 8, and sends it to the large DOF display for immediate presentation in a step 104. The logic then proceeds with step 98, as described above. With this embodiment, the viewer sees a still scene on the display and may freely look around and shift focus between the various objects in the scene.

Figure 9:
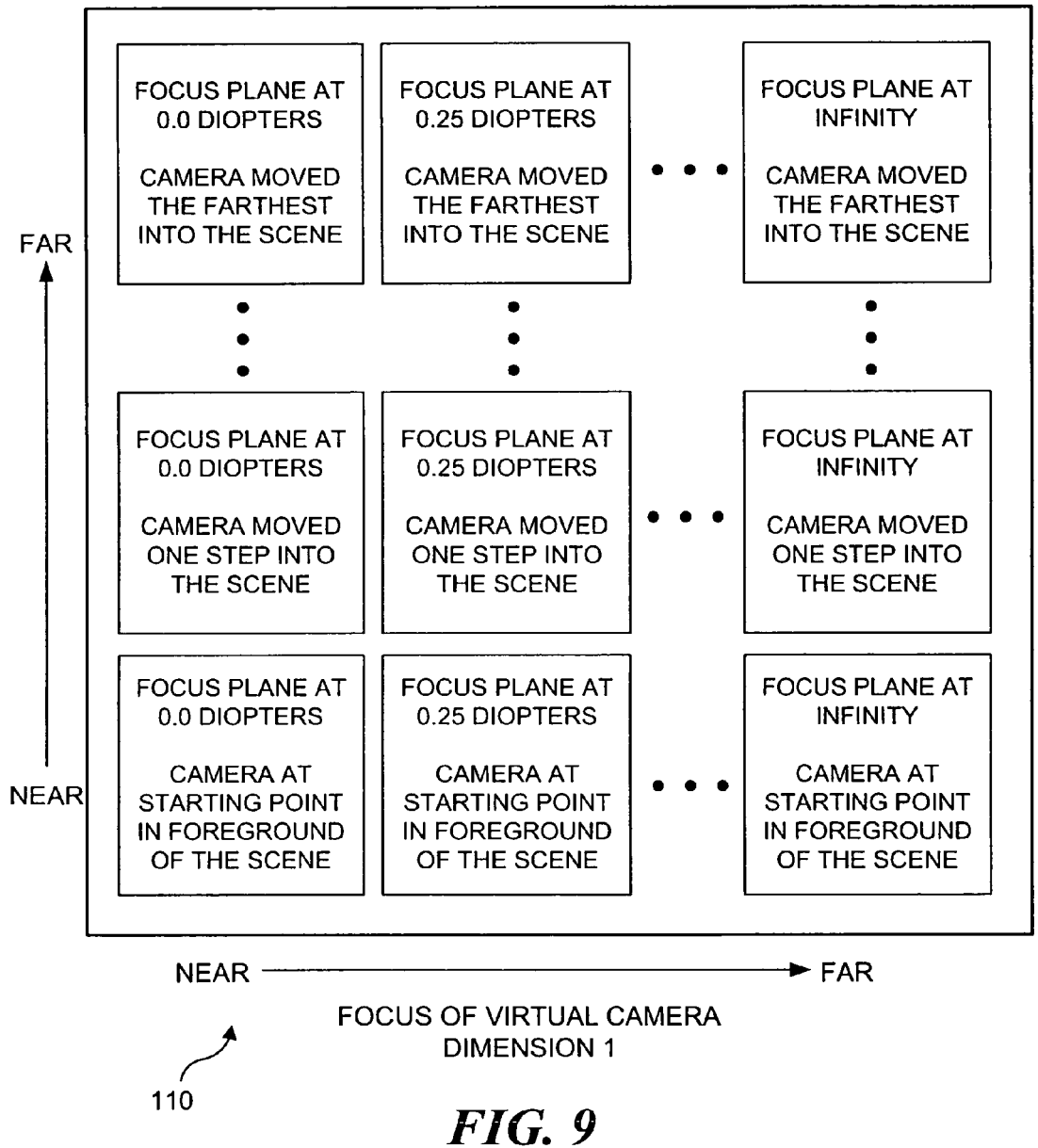
FIG. 9 illustrates an array of 2-D images that are pre-prepared for use in the present invention.

Another method to handle virtual scenes with pre-rendering is similar to that discussed above, with the difference that a multi-dimensional array of 2-D images of a virtual scene is pre-rendered. As a simple example, a 2-D array 110 is shown in FIG. 9 (higher dimensional arrays are also useful, but are more difficult to depict). Along one dimension of the array, e.g., the horizontal axis, the position of the plane of best focus varies and in other dimensions, e.g., along the vertical axis, different aspects of the scene rendering vary. In the exemplary 2-D array of FIG. 9, 2-D images are created so that along the first dimension, the best focus plane varies and along the second dimension, the forward and backward position of the virtual camera varies. A third dimension can be incorporated into the array to represent animation of (an) object(s) within the scene. Additional dimensions can be used to represent more complex object animation, camera motion (e.g., pitch, yaw, translation, etc.), or other dynamic properties of the scene. This implementation gives the viewer greater freedom to move around an animated scene and dynamically accommodate to different objects, while keeping the demand on the processor of the computing device relatively low.

For all of the embodiments described in this document, cylindrical or spherical image formats (such as the Apple Corporation's Quicktime™ VR format) or 2½-D image formats can be used in place of 2-D images. Cylindrical or spherical image formats render a panoramic view of a scene, and enable a viewer to rotate his/her virtual view of a scene, without requiring the system to render separate images for each view rotation. Two and one-half dimensional image formats retain the z-axis (depth) information for each pixel of a rendered image. In this case, the images are pre-rendered without focus effects and the focus effects are rendered in real-time from the z-axis information. Many 3-D rendering software packages separate the rendering of the 3-D scene from the rendering of the focus effects. First, these software programs render a 2½-D image from the 3-D scene, then they render a selectively blurred 2-D image from the 2½-D image. In addition, a hybrid 2½-D cylindrical or spherical image format, in which a cylindrical or spherical image contains z-axis (depth) information, can also be used in place of 2-D images in the present invention. Each of these image format alternatives are compatible with the single and multi-dimensional array embodiments described in this document. As with the real-time rendering implementation, stereographic images can be generated by pre-rendering the virtual scene from two viewpoints. All of the embodiments described herein can be applied to stereographic images. To conserve storage space, the images can be compressed, and/or the arrays of images can be converted into a video format and compressed using motion compression algorithms (such as that employed in the Moving Picture Experts Group (MPEG) algorithm).

Real Scenes—Pre-Captured Images: This embodiment is also relevant to the steps of path B in FIG. 8. As shown in regard to a system 130 in FIG. 10, one method of generating images of real scenes is to employ a camera 136 (video or still, digital or analog) to acquire a number of images from a real 3-D scene 140, while the focus of camera lens 138 is varied across the images, from nearest focus to optical infinity (so that objects on different planes of depth will come into focus and out of focus across the set of images). If an analog camera is used, the pictures are digitized and loaded into the storage of computing device 132. The images are placed in an ordered array from farthest focus to nearest focus, and each image is coded to identify its best focused fixation plane. A database is generated that links images in the array to estimated accommodation levels (e.g., an image taken with the camera focused at infinity is linked with an accommodation estimate of 0.0 diopters).

The operations of the computing device for this implementation are similar to those for the pre-rendered virtual scenes, supra. All of the methods previously described for acquiring, representing, and handling images of virtual scenes are also applicable to the pre-captured images of real scenes. For instance, the captured images can be formed into multi-dimensional arrays to allow for greater interactivity with the displayed scene (e.g., the viewer and/or objects can move within a scene) and cylindrical and spherical image formats, 2½-D image formats, and 2½-D cylindrical and spherical image formats can be used in place of standard 2-D images.

Stereo images are generated by acquiring images from two viewpoints in a scene (two cameras can be used simultaneously, or one camera can be moved between to viewpoints serially). The viewpoints can be equal in separation to that of human eyes, or they can be farther apart to exaggerate the stereo information (or closer together to decrease the stereo disparity). In all of the methods mentioned herein, stereo images can be substituted for images.

Multiple cameras with different focal lengths can be used to simultaneously acquire images from the same scene. A conventional software algorithm is used to interpolate intermediate images between the acquired images from the different cameras (e.g., if one camera is focused at 4 diopters and the other camera is focused at 5 diopters, the software algorithm is used to interpolate images with a focus of 4.5 diopters). This approach enables a set of images with varied focus planes to be generated for a moving scene. When performed with a set of still cameras, the method creates a set of pictures of the same freeze-frame of a moving scene. When performed with a set of video cameras, the method can create a set of movie channels that are identical except for their focus planes. When the movies are played back, the accommodation of the viewer controls the channel that is displayed on the large DOF display. Thus, the viewer is able to watch a movie, while dynamically accommodating to different objects in the movie scene.

Figure 10:
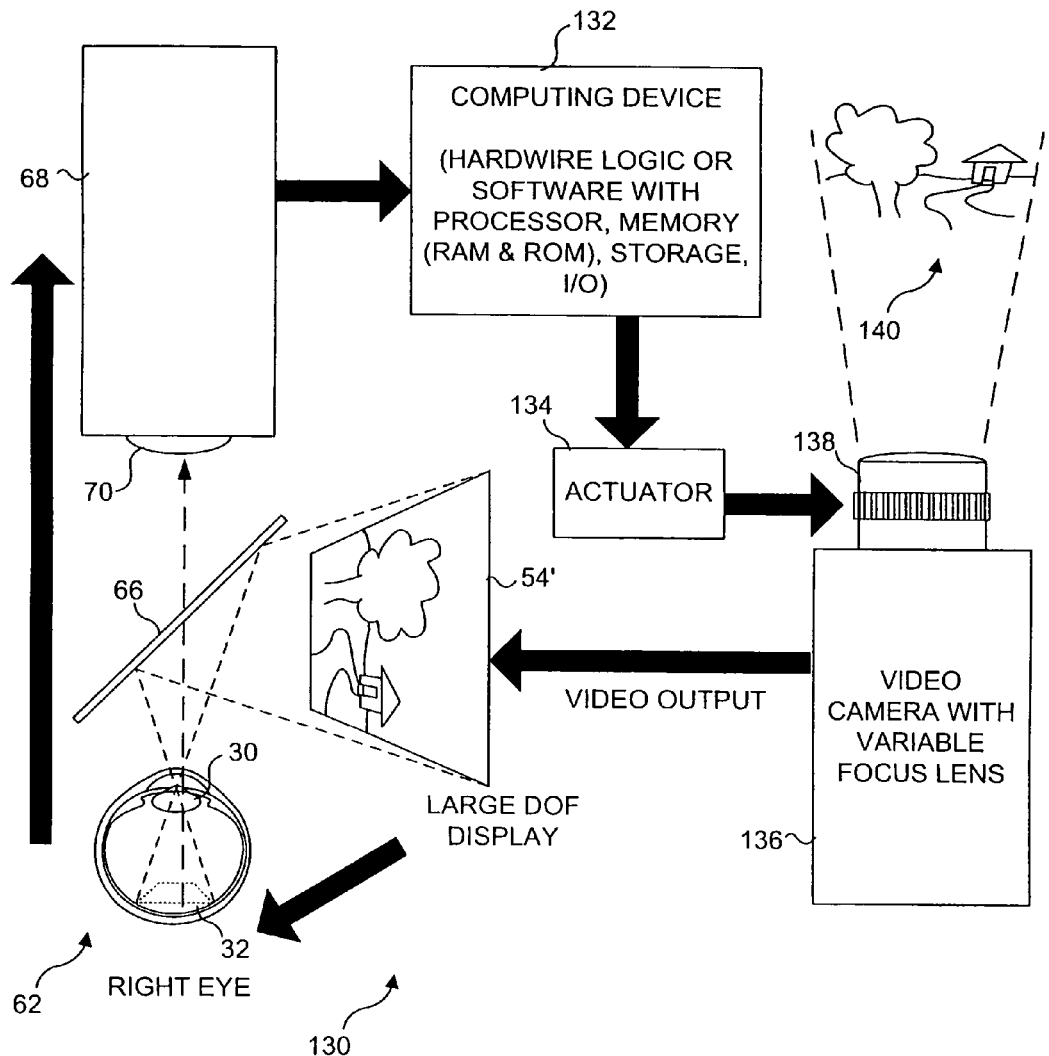
FIG. 10 is a schematic diagram illustrating an arrangement for real-time focus control of a remote video camera with accommodation, wherein a viewer sees a real scene of a large DOF display, and accommodation is monitored dynamically.

Real Scenes—Real-time Camera Control: This embodiment is relevant to the steps of path C in FIG. 8. One or more video cameras (digital or analog) are used to film real scene 140, generally as shown in FIG. 10. This footage is relayed to large DOF display 54' in real-time, so the viewer can see the scene from the camera's point of view. Video camera 136 can be in the vicinity of the viewer, to show the viewer's own environment, or the video camera can be at a remote location, enabling telepresence and teleoperation abilities. The focus of the camera is changed with an actuator 134. The computing device controls the focus by sending signals to the actuator, and the focus is dynamically changed (a step 108 in FIG. 8) to match the accommodation level of the viewer, as indicated in a step 106 of FIG. 8. Two cameras can be used to create stereo video images. The accommodation of the viewer measured with accommodation monitoring device 68 provides a signal to computing device 132, which controls the focus for each of the cameras in response, as shown in FIG. 10.

In addition to measuring accommodation, the motion of the viewer's head can be tracked, and the orientation of the camera(s) (e.g., pan, tilt, yaw, etc.) can be actuated to follow the head motion. Optionally, the vergence angle of the eyes can control the vergence angle of the cameras. The zoom of the lens can be linked to an input device (e.g., joystick or keyboard) to allow the viewer to move in and out of the scene.

These features enable a viewer to look around a remote real scene in real-time, accommodate naturally to objects in the scene, and zoom in on objects.

Another embodiment uses a similar arrangement, with the exception that the accommodation of the viewer controls another mechanism of the camera. For instance, the zoom level of the camera can be linked to the accommodation of the viewer. When the viewer accommodates to a distant object in the scene, the camera zooms in towards that object. In another embodiment of this concept, the accommodation of the viewer can be used to control a linear actuator that physically translates a camera forward and backward relative to the scene being recorded with the camera.

Other Modifications:

A number of exemplary implementations of the present invention have been discussed above. Combinations of any the elements from the exemplary implementations can be formed into many other implementation variants, which are too numerous to specifically describe. Other non-described implementations that combine elements of these described implementations are also claimed.

All of the embodiments described above can be applied to stereographic images, such as varying the focus of a stereoscopic pair of cameras instead of only a single camera. In addition, for all of the embodiments described herein, cylindrical or spherical image formats (such as the Quicktime™ VR format) and 2½-D image formats can be used in place of 2-D images.

Integrated Large DOF Display with Infrared (IR) Eye Tracking: The accommodation and/or vergence monitoring device can be incorporated into the large DOF display. They are listed as separate components in the rest of this disclosure, but they can be combined into one physical unit. This combination of components makes the system lighter, more compact, and is expected to be more energy efficient.

For example using the VRD, constant intensity IR laser light can be added to the modulated visible light source of the VRD before the beams are scanned to the eye. The intensity and distribution of IR light beams reflected from the eye will depend on the viewer's line of sight within the display. If the gaze of the eye is aligned with the collimated beam of IR light, then the angle of incidence of the incident beam will have zero degrees. After striking the apex of the viewer's cornea, the reflected beam will broaden while returning through the X-Y scanners to the original source. Typically, the source is an optical fiber. Therefore, surrounding the source fiber can be one or more rings of optical fibers to collect the reflected beam of light. Only when the IR beam of light is aligned with the viewer's line of sight will the reflected beam have a high intensity that is distributed symmetrically about the central axis, corresponding to the central source fiber. Thus, equal intensities of light should be collected in each optical fiber within each ring when the scanned beam of IR light is aligned with the viewer's line of sight. When the IR beam is not aligned with the viewer's line of sight, the reflected beam is not centered about the central source fiber among the ring of collection fibers. Accordingly, some collection fibers will have much lower intensities than collection fibers on the opposite side of the ring. During each frame of the display, the scanned IR beam and its distribution of reflected light will track which pixel the viewer is centrally fixated on. By determining the scan position or pixel being fixated on by both left and right eyes of the viewer, the vergence angle can be calculated and accommodation can be inferred.

A large DOF display with an array of multiple exit pupils can be used to enable users to change eye position within a large field of view display without "losing" the single small exit pupil. To prevent multiple exit pupils from entering the viewer's eye, the array can be spaced apart such that only one exit pupil can enter the eye at any one time. Another option is to turn off all exit pupils not centrally aligned with the viewer's gaze. Crude eye-tracking can be used to determine the exit pupil that should be active. Alternatively, eye-tracking can be used to actively keep a single exit pupil centrally aligned with the viewer's eye.

As people age, the crystalline lens becomes less elastic, and the maximum magnitude of their accommodative range decreases. This reduced ability to accommodate or vary focus is termed presbyopia. The amplitude of accommodation shifts of older viewers can be amplified, so that small changes in accommodation result in larger shifts of the simulated focal plane in the large DOF display. The total range of youthful accommodation can be mapped onto the restricted range of older viewers. For instance, if an older viewer can only accommodate to a maximum of 2 diopters, that accommodation level can be linked with images displaying a 10 diopter focus level.

The accommodation of the viewer can be extended beyond the natural range of human eyes, such as looking and focusing very close to an object. The ability to maintain focus will produce a magnifying effect in a display, such as looking through a magnifying glass or microscope.

Non-natural fixation depths can be used to enable a viewer to look into regions not normally accessible. For instance, a doctor can use a large DOF see-through HMD (like that of FIG. 5) while examining a patient. Reconstructed data from imaging scans (e.g., fMRI, MRI, CAT, PET, EEG, MEG, EKG, x-ray, etc.) can be superimposed over the doctor's real view of the patient. The doctor can accommodate to the level of the patient's skin and see the real view of the skin. As the doctor shifts the accommodation and vergence level in towards the inside of patient's body, an x-ray view of the patient's broken bone can be brought into view. The interface can be configured such that the bone only comes into focus when the doctor accommodates to its real depth. This provides the doctor with an intuitive feel for the location of the bone break, and may help the doctor find an internal site more rapidly and efficiently when performing surgery, for example, using laparoscopic techniques. By applying the natural oculomotor processes of accommodation and vergence to non-natural data sets (like x-ray data), those data sets may be understood more easily. This approach can be used for general data visualization applications. The accommodation and vergence level provides a natural means of controlling an additional variable when sorting through any data set.

Changes in Depth of Field: Using the methods described in this document, one can render images from a virtual scene with any desired depth of field. A DOF that approximates that of the normal human eye allows for the most natural perception of a scene. A DOF that is more narrow than that of normal human vision may exaggerate the role of focus on perception of the scene. A hyperreal focus effect may be achieved. The role of focus will be more salient, and this salience may help viewers with accommodative dysfunction, such as the inability to focus accurately, to improve their accuracy. By exaggerating the errors of incorrect accommodation levels, the feedback to the accommodation system is increased. This display system could be used as an accommodation trainer for those who suffer from accommodative dysfunction.

Non-Display Applications: The focus level of the eye provides data to the computing device about which objects are being attended to. A disabled user could interact with real and virtual scenes by shifting focus to an object. A 3-D eye tracking system and 3-D mouse can be formed with the accommodation measurement method.

Simulated Longitudinal Chromatic Aberration: In addition to dioptric blur, the human accommodation system also receives feedback in the form of longitudinal chromatic aberration (LCA) when the eye accommodates. Short wavelengths (blue) are more strongly refracted than medium wavelengths (green), which in turn are more strongly refracted than long wavelengths (red). Thus for a given level of accommodation, the red, green and blue channels of an image are not equally blurry. The differences in blur across color channels provide the human accommodation system with additional feedback to control accommodation. All of the methods in this document that have been applied to blur information can be equally applied to LCA information. The LCA can be simulated for images in addition to (or as an alternative to) the simulation of blur. Computing device images, like the color photoreceptors of the eye, are divided into red, green, and blue components (or "channels"). In natural vision, the optics of the eye do not refract each wavelength of light to the same extent.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A method for more accurately conveying depth in an image, comprising the steps of:
    (a) displaying an image to a viewer on a large depth of focus display wherein all elements in the image are initially displayed at an optical focus level that is substantially the same for all elements, thereby simulating an unnatural or artificial viewing condition, since elements viewed at different distances from the viewer would naturally appear at different focus levels;
    (b) determining an accommodation for an eye of the viewer who is watching the image on the large depth of focus display, as a gaze of the viewer is directed toward an element in the image; and
    (c) displaying an image having an apparent focus plane that tracks the accommodation of the viewer by adding blurring to other elements in the image in proportion to their distance in depth from the viewpoint of the viewer, so that as the accommodation of the viewer watching the large depth of focus display changes to focus the eye of the viewer at a different viewing distance, the image that is displayed is changed to more accurately visually convey depth in the image that is displayed, based on the accommodation that was determined and thereby simulating a natural viewing condition.

2. The method of claim 1, wherein the step of determining the accommodation comprises the step of directly measuring the accommodation in at least one eye of the viewer.

3. The method of claim 1, wherein the step of determining the accommodation comprises the steps of:
    (a) measuring a vergence of at least one eye of the viewer when watching the large depth of focus display; and
    (b) determining the accommodation as a function of the vergence.

4. The method of claim 1, wherein the step of determining the accommodation comprises the steps of:
   (a) measuring a gaze direction of the viewer when watching the large depth of focus display; and
   (b) anticipating the accommodation of the viewer from the gaze direction.

5. The method of claim 1, further comprising the step of rendering in real-time, each image having an apparent focus plane that tracks the accommodation of the viewer, on the large depth of focus display.

6. The method of claim 5, wherein objects within each image that are farther away from the apparent focus plane in the image are rendered at a lower resolution and contrast, to substantially reduce a computational overhead required for rendering the image on the large depth of focus display.

7. The method of claim 1, further comprising the step of pre-preparing a plurality of images having a range of different apparent focus planes, so that the image having the apparent focus plane that tracks the accommodation of the viewer is selected from the plurality of images that were pre-prepared.

8. The method of claim 7, wherein the plurality of images are arranged in a multi-dimensional array, at least one axis of the multi-dimensional array corresponding to a disposition of the apparent focus plane in the plurality of images.

9. The method of claim 8, wherein each other dimension of the multi-dimensional array corresponds to a different parameter that varies within the plurality of images.

10. The method of claim 9, further comprising the step of enabling the viewer to provide an input that varies a value of a parameter for at least one of the other dimensions, to affect the image provided to the large depth of focus display.

11. The method of claim 10, wherein the parameter comprises one of:
   (a) a motion of a camera into a scene comprising the plurality of images;
   (b) an orientation of a camera used to image a scene to produce the plurality of images; and
   (c) a zoom level of a camera used to produce the plurality of images.

12. The method of claim 8, wherein the image that is displayed by the large depth of focus display is a 2½-dimensional image comprising visual depth information.

13. The method of claim 7, wherein the plurality of images are pre-prepared by capturing a scene with a camera having a variable focus set at a plurality of different focal planes.

14. The method of claim 1, further comprising the step of producing the image having the apparent focus plane that tracks the accommodation of the viewer by adjusting a focus of a variable focus camera so that the variable focus camera produces said image by imaging a real scene with the focus set at said apparent focus plane.

15. The method of claim 1, further comprising the step of producing successive images having apparent focus planes that track the accommodation of the viewer, at a sufficiently fast image rate to produce a perception of motion of an object within the successive images.

16. The method of claim 1, further comprising the step of producing an image having at least one element that is laterally shifted and having an apparent focus plane that tracks the accommodation of the viewer, so that each eye sees a different image, to provide a stereographic effect.

17. The method of claim 1, further comprising the step of employing a graphic rendering algorithm to blur objects that are not disposed at the apparent focus plane in the image.

18. The method of claim 1, wherein the step of determining the accommodation comprises the step of employing light that is not visible to a human, to measure the accommodation for the eye of the viewer.

19. The method of claim 1, wherein the image that is displayed by the large depth of focus display is in a non-planar format.

20. A system for more accurately conveying depth in an image, comprising:
   (a) a large depth of focus display;
   (b) an image source that cooperates with the large depth of focus display to produce an image that can be viewed;
   (c) a device that monitors at least one eye of a viewer to produce a signal indicative of an accommodation of said at least one eye; and
   (d) a computing device coupled to the image source and to the device, said computing device carrying out a plurality of functions, including:
     (i) displaying the image to a viewer on the large depth of focus display wherein all elements in the image are initially displayed at an optical focus level that is substantially the same for all elements, thereby simulating an unnatural or artificial viewing condition, since elements viewed at different distances from the viewer would naturally appear at different focus levels;
     (ii) determining an accommodation for an eye of a viewer who is watching the image on the large depth of focus display as a gaze of the viewer is directed toward an element in the image; and
     (iii) displaying an image having an apparent focus plane that tracks the accommodation of the viewer, so that as the accommodation of the viewer by adding blurring to other elements in the image in proportion to their distance in depth from the viewpoint of the viewer, so that as the accommodation of the viewer watching the large depth of focus display changes, to focus the eye of the viewer at a different viewing distance, the image that is displayed is changed to more accurately visually convey depth in the image that is displayed, based on the accommodation that was determined, thereby simulating a natural viewing condition.

21. The system of claim 20, wherein the device emits light for directly measuring the accommodation in at least one eye of the viewer.

22. The system of claim 20, wherein the device determines the accommodation by:
   (a) measuring a vergence of at least one eye of the viewer; and
   (b) determining the accommodation as a function of the vergence.

23. The system of claim 20, wherein the device measures a gaze direction of the viewer, and the computing device anticipates the accommodation of the viewer based upon the gaze direction.

24. The system of claim 20, wherein in real-time, the computing device renders each image having an apparent focus plane that tracks the accommodation of the viewer, on the large depth of focus display.

25. The system of claim 24, wherein objects within each image that are farther away from the apparent focus plane in the image are rendered at a lower resolution and contrast by the computing device, to substantially reduce a computational overhead required for rendering the image on the large depth of focus display.

26. The system of claim 20, wherein a plurality of images having a range of different apparent focus planes are pre-prepared, so that the image having the apparent focus plane that tracks the accommodation of the viewer is selected by the computing device from the plurality of images that were pre-prepared.

27. The system of claim 26, wherein the plurality of images are arranged in a multi-dimensional array, at least one axis of the multi-dimensional array corresponding to a disposition of the apparent focus plane in the plurality of images.

28. The system of claim 27, wherein each other dimension of the multi-dimensional array corresponds to a different parameter that varies within the plurality of images.

29. The system of claim 28, wherein the computing device responds to a user input that varies a value of a parameter for at least one of the other dimensions, causing a corresponding change in the image on the large depth of focus display.

30. The system of claim 29, wherein the image source comprises a camera that is used to produce the plurality of images, and wherein the parameter comprises one of:
  (a) a motion of the camera into a scene comprising the plurality of images;
  (b) an orientation of the camera when imaging a scene to produce the plurality of images; and
  (c) a zoom level of the camera when producing the plurality of images.

31. The system of claim 27, wherein the image source displays a 2½-dimensional image on the large depth of focus display, so that a 2-dimensional image can be rendered by the computing device at a desired apparent focus plane using the depth information for the 2½-dimensional image, to reduce computational overhead.

32. The system of claim 25, wherein the image source comprises a camera having a variable focus, and wherein the plurality of images are pre-prepared by capturing a scene with the camera with the variable focus set at a plurality of different focal planes.

33. The system of claim 20, further comprising an actuator coupled to a variable focus adjustment of a camera and to the computing device, said computing device producing the image having the apparent focus plane that tracks the accommodation of the viewer by controlling the actuator to adjust a focus of the camera so that the camera produces said image by imaging a real scene with the focus set at said apparent focus plane.

34. The system of claim 20, wherein the computing device selects successive images having apparent focus planes that track the accommodation of the viewer, at a sufficiently fast image rate to produce a perception of motion of an object within the successive images viewed on the large depth of focus display.

35. The system of claim 20, further comprising another image source that is coupled to the computing device and produces an image in which at least one element is laterally shifted, said image having an apparent focus plane that tracks the accommodation of the viewer, so that each eye sees a different image, to provide a stereographic effect.

36. The system of claim 20, wherein the computing device executes a graphic rendering algorithm to blur objects that are not disposed at the apparent focus plane in the image.

37. The system of claim 20, wherein the device uses light that is not visible to a human to measure the accommodation for the eye of the viewer.

38. The system of claim 20, wherein the image source displays an image on the large depth of focus display in a non-planar format.

39. The system of claim 20, further comprising a beam splitter so that light from the image source is reflected into an eye of the viewer, while light used by the device for determining the accommodation travels between the device and the eye of the viewer through the beam splitter.

40. The system of claim 20, further comprising a beam splitter so that light from the image source is transmitted into an eye of the viewer, while light used by the device for determining the accommodation is reflected into the eye of the viewer by the beam splitter.

41. The system of claim 20, further comprising a beam splitter, said beam splitter reflecting light from one of the image source and a real world scene, so that the viewer can simultaneously view the real world scene and the image provided by the image source.

42. The method of claim 12, further comprising the step of rendering a 2-dimensional image at a desired apparent focus plane using the depth information for the 2½-dimensional image, if the accommodation of the viewer has changed, thereby reducing a computational overhead because the 2½-dimensional image does not have to be re-rendered.

43. The method of claim 12, further comprising the step of re-rendering the 2½-dimensional image if either the accommodation of the viewer moves within a scene or the viewer views an object that is moving in the scene.

44. The method of claim 12, wherein the 2½-dimensional image is either a cylindrical image or a spherical image.

45. A method for more accurately conveying depth in an image, comprising the steps of:
  (a) displaying a 2½-dimensional image comprising visual depth information to a viewer on a large depth of focus display;
  (b) determining an accommodation for an eye of the viewer who is watching the 2½-dimensional image on the large depth of focus display;
  (c) preparing a plurality of images arranged in a multidimensional array and having a range of different apparent focus planes, at least one axis of the multi-dimensional array corresponding to a disposition of the apparent focus plane in the plurality of images;
  (d) selecting the image having the apparent focus plane that tracks the accommodation of the viewer from the plurality of images that were pre-prepared, said image being a 2-dimensional image; and
  (e) as the accommodation of the viewer watching the large depth of focus display changes, using the depth information of the 2½-dimensional image to display the 2-dimensional image, in order to more accurately visually convey depth, said use of depth information thereby reducing a computational overhead because the 2½-dimensional image does not have to be re-rendered.

46. A method for more accurately conveying depth in an image, comprising the steps of:
  (a) displaying a 2½-dimensional image comprising visual depth information to a viewer on a large depth of focus display;
  (b) determining an accommodation for an eye of the viewer who is watching the 2½-dimensional image on the large depth of focus display;
  (c) preparing a plurality of images arranged in a multidimensional array and having a range of different apparent focus planes, at least one axis of the multi-dimensional array corresponding to a disposition of the apparent focus plane in the plurality of images;
  (d) selecting the image having the apparent focus plane that tracks the accommodation of the viewer from the plurality of images that were pre-prepared, said image being a 2½-dimensional image; and (e) as the accommodation of the viewer watching the large depth of focus display moves within a scene or the viewer views an object that is moving in the scene, displaying the 2½-dimensional image having the apparent focus plane that tracks the accommodation of the viewer, in order to more accurately visually convey depth, based on the accommodation that was determined.

* * * * *